United States Patent [19]
Taylor et al.

[11] Patent Number: 5,088,635
[45] Date of Patent: Feb. 18, 1992

[54] GOLF BAG RACK

[76] Inventors: Mansell M. Taylor, P.O. Box 1482, Auburn, Me. 04211-1482; Kevin J. Ross, 75 Valview Dr., both of Auburn, Me. 04210

[21] Appl. No.: 565,496
[22] Filed: Aug. 10, 1990
[51] Int. Cl.⁵ .............................................. B60R 9/08
[52] U.S. Cl. ............................. 224/274; 224/42.31; 248/96
[58] Field of Search ............... 224/274, 42.13; 211/70.2; 248/96; 280/769, DIG. 5

[56] References Cited
U.S. PATENT DOCUMENTS

| | | | |
|---|---|---|---|
| 2,007,709 | 7/1935 | Eppens | 248/96 |
| 3,784,138 | 1/1974 | Herling et al. | 248/96 |
| 4,533,013 | 8/1985 | Hightower | 224/274 |

Primary Examiner—Renee S. Luebke
Attorney, Agent, or Firm—Sixbey, Friedman, Leedom & Ferguson

[57] ABSTRACT

A rack for holding golf bags which can be mounted on the upper surface of each rear fender of a conventional motor-driven golf cart is provided to expand the bag carrying capacity of the cart from two to four bags. The rack includes a mounting base which is secured to the cart fender and a bag support member joined to the mounting base at an angle which holds the golf bag in an optimum club-dispensing position. A pair of substantially semicircular clips is provided at the terminal ends of the mounting base and support element to receive a golf bag and secure it on the rack against lateral and other movement while the cart is in travel.

17 Claims, 3 Drawing Sheets

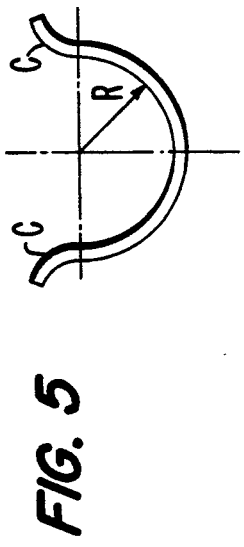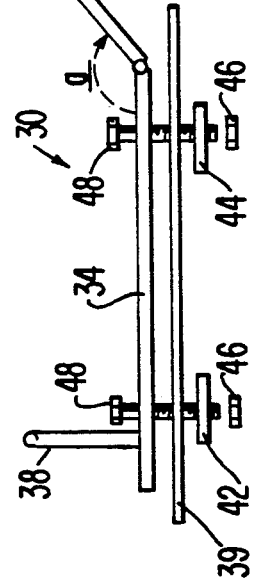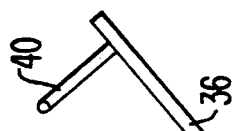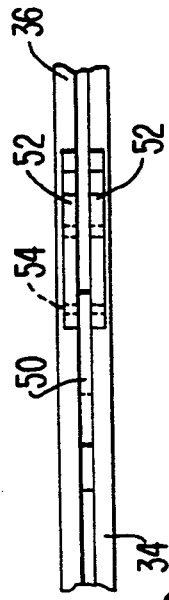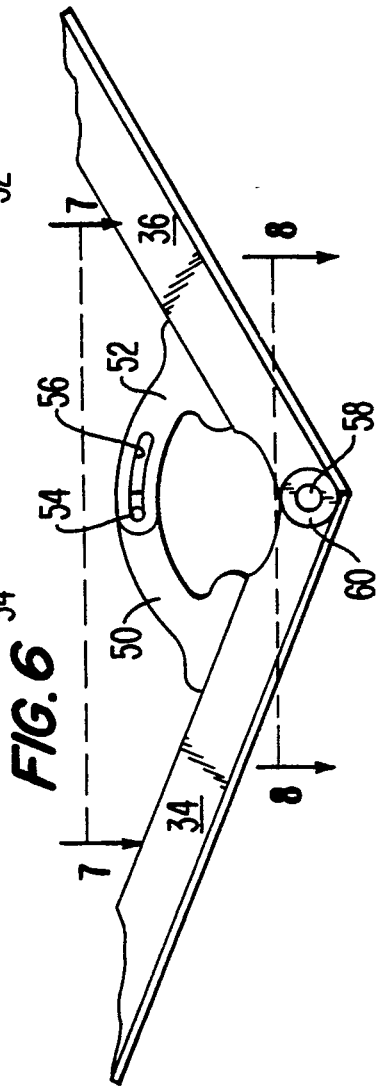

GOLF BAG RACK

TECHNICAL FIELD

The present invention relates generally to racks and holders for golf bags and specifically to a rack for golf bags to be mounted on a motor driven golf cart.

BACKGROUND OF THE INVENTION

The sport of golf has enjoyed a great deal of popularity over the years. Many golfers either carry the large bag of clubs and accessories which the sport requires or pull their bags of clubs on wheeled carts around the golf course. However, most golfers prefer to navigate the course in a motor driven cart. Many golf and country clubs, moreover, require the use of motor driven carts by the golfers who play these courses. The use of motorized carts is thought to decrease playing time and permit more golfers to play the course in a given time interval.

The majority of those who play golf are generally willing to accept a requirement such as the use of motorized carts if it shortens their wait to tee off, particularly on a busy weekend day. The foursome that likes to drive its way between shots and from hole to tee is perfectly happy to comply with the motorized cart requirement and play golf in this fashion. However, studies have demonstrated that the exercise value of golf is diminished significantly if the golfer rides rather than walks between shots. Consequently, those who play golf to benefit from the exercise it provides prefer not to use motor driven carts.

Because the motor driven carts used by most golf and country clubs accommodate only two people and two bags, a separate cart is needed for each two golfers. Two motor driven carts are required to transport each foursome. As a result, this limitation dramatically increases the number of motorized carts that clubs which require their use must keep available to handle peak playing hours without complaints from the golfers. The maintenance and storage demands of maintaining a large motor driven golf cart inventory, moreover, can be considerable.

It would be desirable, therefore, to provide a motorized golf cart adaptable both to fulfill the interests of the golf course in reducing playing time and to meet the desires of the golfers for exercise. These dual requirements could be met by providing a single motorized cart that would accommodate all of the golf bags and other equipment needed by a foursome and also allow at least two of the golfers to ride. Those golfers in the group who prefer to walk could do so without delaying play by having to carry or pull their bags, and those who prefer to ride could also do so. Any motor driven cart satisfying this objective would be required to hold four golf bags. Most currently available motorized golf carts have racks that will accommodate only two standard sized golf bags.

The prior art has proposed a holder for four golf bags which can be mounted on a motor driven golf cart. The golf bag holder described in Casady U.S. Pat. No. 4,355,746 includes a frame with a plurality of pivotally mounted spring-loaded arms which extend vertically upward from the rear deck of the cart when not attached to a golf bag. The attachment of a golf bag to one of the spring-loaded arms pulls the arm down. Brackets on each cart fender hold the bottom of a bag mounted on one of the outermost arms. Not only is the golf bag rack disclosed in U.S. Pat. No. 4,355,746 complicated and cumbersome, but the pivotally mounted arms cannot be secured to the rack frame in an orientation which optimally support every type of golf bag. In addition, because the bag-holding arms are spring-loaded, the stability of the golf bag held by one of these arms depends on the weight of the bag. If several clubs are removed from the bag, the bag will not be securely supported against lateral movement. Moreover, the spring-loaded arms could be adversely affected by driving the cart over rough terrain. Finally, the vertical arrangement of the bag-holding arms may preclude the use of a canopy over the seats on some carts.

In U.S. Pat. No. 3,884,439, Jeninga discloses a cradle bracket for a golf bag that is mountable in the rear of a motor driven golf cart to hold a golf bag at an angle which permits the clubs to be removed easily. Although this bracket holds the bag securely in the cart, the security is achieved in large measure by an additional strap which, with the bracket, encircles the golf bag. Moreover, there is no suggestion that more than two golf bags could be supported by such a bracket on a motor driven golf cart.

The prior art, therefore, has failed to disclose a simple golf bag rack which can easily be mounted on the rear fenders to expand the bag carrying capacity of a motor driven golf cart from two to four bags without interfering with the conventional two bag carrying capacity of the cart, or other features of the cart.

SUMMARY OF THE INVENTION

It is a primary object of the present invention, therefore, to overcome the disadvantages of the prior art and to provide a rack to hold a golf bag which may be mounted on a motor driven golf cart to expand the bag carrying capacity of the cart.

It is another object of the present invention to provide a golf bag rack for a motorized golf cart that securely holds the golf bag in an optimum club holding and dispensing orientation both when the cart is in motion and when the cart is stopped.

It is yet another object of the present invention to provide a golf bag rack mountable on the fender of a conventional motor driven golf cart.

It is a further object of the present invention to provide a golf bag rack mountable on the fender of a conventional motor driven golf cart having a configuration that prevents lateral and other undesired movement of the bag.

The foregoing objects are satisfied by providing a golf bag rack including a unitarily constructed mounting base mountable on the fender of a conventional motorized golf cart and angled bag support member attached to one end of the mounting base. A pair of substantially semicircular bag holding clips located at the terminal end of the base and at the terminal end of the support member secure the bag while the cart is in operation and prevent lateral movement of the bag. Two bag racks may be mounted on both fenders of the golf cart to expand the bag carrying capability of the cart from two bags to four without changing the centrally positioned bag racks typically provided on motor driven golf carts.

Other objects and advantages will be apparent from the following description, claims and drawings.

BRIEF DESCRIPTION OF THE DRAWINGS

FIG. 4 is a schematic side view of the golf bag rack and mounting structure according to the present invention;

FIG. 5 is an end view of a bag holding clip according to the present invention;

FIG. 6 is a side view of one embodiment of the joint between the mounting base and bag support element of the rack of the present invention;

FIG. 7 is a cross-sectional view taken along line 7—7 of FIG. 6; and

FIG. 8 is a cross-sectional view taken along line 8—8 of FIG. 6.

DESCRIPTION OF THE PREFERRED EMBODIMENTS

The golf bag rack of the present invention simply and effectively increases the bag holding capacity of the kind of conventional motor driven golf cart in use at most golf courses from two bags to four bags. Consequently, a foursome of golfers can easily use a single cart especially if one or more of the golfers wants to walk rather than ride. A golf cart modified by the addition of a pair of golf bag racks according to the present invention enables exercise conscious golfers to comply with course requirements regarding use of motor driven carts. In addition, accommodating a foursome with one cart rather than two reduces cart inventory and the maintenance and storage problems which accompany a large motorized cart inventory. The expanded bag carrying capability achieved by the golf bag racks described herein could also be quite useful in professional golf tournaments or matches in the event one player has a collection of golf clubs that will not fit in only one bag.

Figure 1:
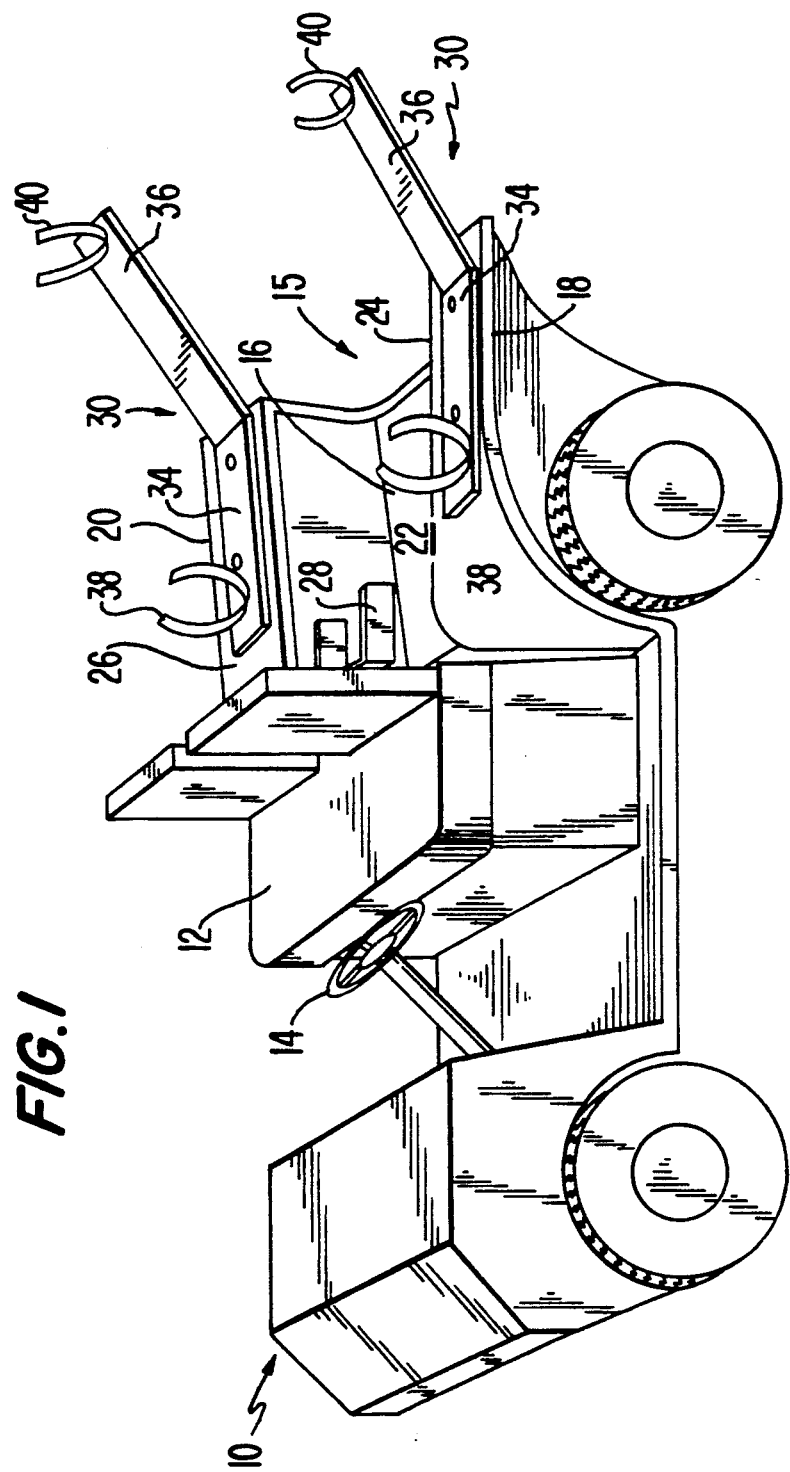
FIG. 1 is a side perspective view of a motor driven golf cart showing two golf bag racks according to the present invention mounted on the rear fenders of the cart.

Referring to the drawings, FIG. 1 illustrates a conventional motor driven golf cart 10 of the type used by most golf courses and country clubs. This type of cart is generally electrically powered and can include various features such as a windshield and canopy top not shown in FIG. 1. Either the bench-type of seat 12 of FIG. 1 or two bucket seats (not shown) may be provided in the cart. The advantage of a bench-type seat is that more than two people can sit on it, if necessary. A steering wheel 14 allows the cart driver to steer the cart.

The rear section 15 of the cart is configured to include a bag recess 16 centrally positioned between two fenders 18 and 20. The bottom 22 of the bag recess 16 is usually substantially below the substantially flat planar upper surfaces 24 and 26 of the fenders 18 and 20, respectively. This allows a standard sized golf bag to stand essentially upright in a vertical position. The bag recess 16 is wide enough to hold at least two golf bags. Brackets 28 and/or straps may be provided to secure the golf bags in the bag recess.

Each fender upper surface 24 and 26 has mounted on it a golf bag rack 30 according to the present invention.

Figure 3:
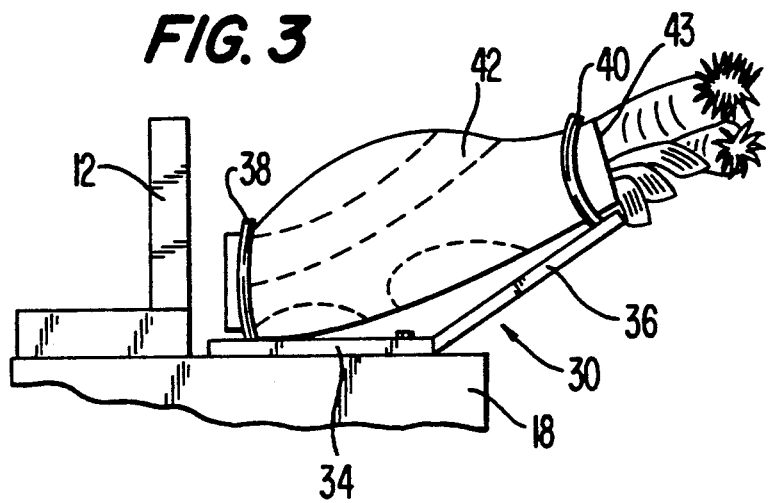
FIG. 3 is a side view of a golf bag rack according to the present invention mounted on a golf cart fender with a golf bag in the rack.

The rack can be easily secured to the cart fender with one or more mounting plates as will be described in detail in connection with FIG. 4. The rack 30 is constructed to include a mounting base 34 and an angled bag support element 36 connected to one end of the mounting base. A pair of substantially semicircular clips 38 and 40 are fastened to the free terminal ends of the mounting base 34 and support element 36, respectively. As shown in FIG. 3, the bottom of a golf bag is received by clip 38, and the top of a golf bag 42 is received by a clip 40. The clips 38 and 40, which are described in detail in connection with FIG. 5, have a diameter which preferably conforms substantially to the outer diameter of the top and bottom of an average golf bag. The open end of the bag is supported by the rack at an angle which facilitates club removal.

Figure 2:
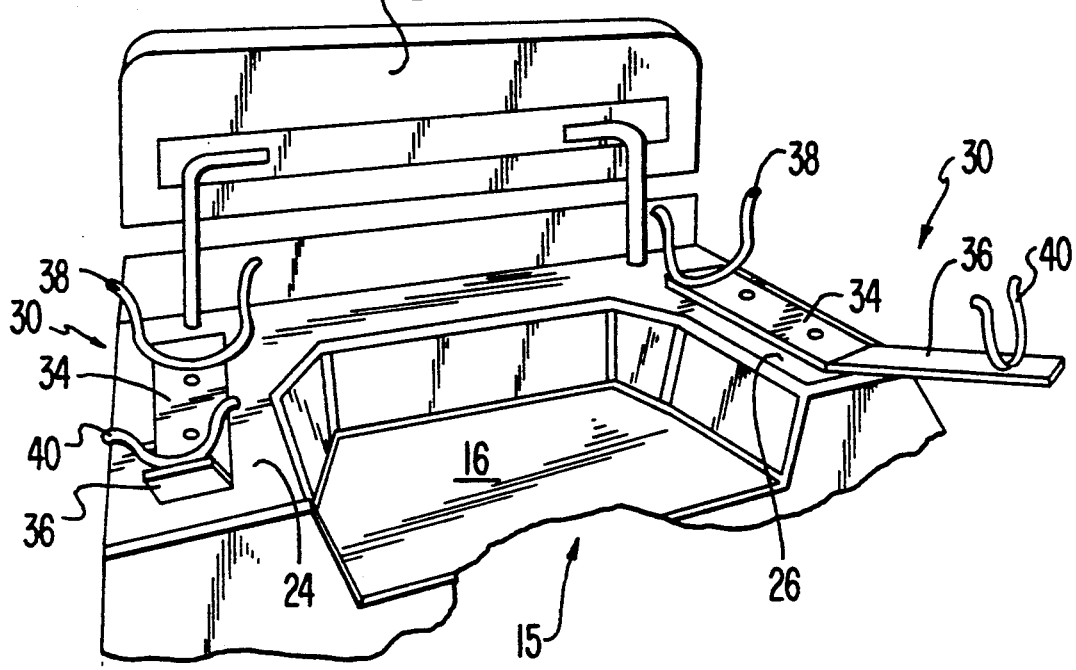
FIG. 2 is a back perspective view of a motor driven golf cart showing two golf bag racks according to the present invention mounted in place.

FIG. 2 illustrates the back view of a portion of a golf cart showing a bag rack 30 of the present invention mounted on each fender. The spacing of each bag rack 30 relative to the conventional centrally positioned bag recess 16 can be seen in FIG. 2. Because the cart fenders 18 and 20 are generally wider than the diameter of the average golf bag, the fender upper surfaces 24 and 26 will easily accommodate both a rack 30 and a golf bag (not shown). The bag racks of the present invention, moreover, can securely be mounted so that the additional bags they hold can be carried without unbalancing the cart.

FIG. 3 illustrates, in side view, the seat 12 and upper portion of one rear fender 18 of a motor driven golf cart. A golf bag rack 30 according to the present invention is shown holding a golf bag 42. The top 43 of the golf bag is held in place by the clip 40 and supported in an optimum club dispensing and receiving position by the rack.

FIG. 4 is a schematic side view of an unmounted bag rack 30 according to the present invention. The mounting base 34 and angled support element 36 may be formed of one piece of material which has been bent at the desired angle. However, it is preferred that these two components be formed separately and hinged together, as shown and discussed in connection with FIGS. 6-8. The angle a between the mounting base 34 and the bag support element 36 should be within the range of 90° to 145° to support a golf bag in a position on the cart where the golfer will have easy access to the top of the bag so that clubs may be removed from and reinserted into the bag without difficulty. The preferred angle a for optimum bag position and club access is about 132°.

FIG. 4 also illustrates preferred mounting structure for securing the rack 30 on the fender of a golf cart, represented at 39, to provide maximum stability to the rack. One or more backing plates, such as the two plates 42 and 44 shown in FIG. 4, containing suitable bolt receiving holes are positioned on the underside of the fender 39 to align with corresponding bolt receiving holes in the rack mounting base 34. Suitable holes are drilled in the fender 39 to permit appropriately sized removable nuts 46 and bolts 48 to be inserted through the mounting base 34, fender 39 and backing plates 42 and 44 and tightened to removably secure the rack into place on the fender of a golf cart. A permanent, non-removable attachment method, such as welding or brazing, could also be used to anchor the rack of the present invention to a golf cart. However, the mounting arrangement just described is preferred.

The golf bag rack 30 of the present invention is preferably constructed of a metal which is lightweight but strong and durable, such as aluminum and the like. The mounting base 34 and bag support element 36 preferably have the flat, substantially rectangular cross section configuration shown in the drawings for maximum stability support and ease of mounting. The bag-holding clips 38 and 40 are preferably rolled from a T-structural metallic material.

Although the preferred material for the rack 30 is metal, one of the ultrahigh molecular plastics now available that is characterized by high strength and lack of brittleness could also be used to form the rack components.

The bag-holding clips 38 and 40 are preferably substantially semicircular in shape so that they extend slightly more than 180° around the bag's circumference to hold the bag securely while allowing easy insertion and removal of a typical golf bag in the rack. FIG. 5 illustrates a preferred clip configuration. The use of a radius R of approximately 5½ inches for each clip has been found to accommodate most standard sized golf bags. Each clip preferably includes an outwardly curved end section c which has a radius of curvature equal to about 0.76R.

It is not necessary to provide additional straps, belts or the like to secure a golf bag in place within the clips 38 and 40. The extended semicircular configuration preferred for the clips will hold a golf bag and clubs in place against both lateral and up-and-down movement while the cart is in operation. However, if desired, additional fastening structure, such as, for example, a bungee cord (not shown), can be attached to each clip to insure completely that the bag will not move from the rack.

As FIG. 1 clearly illustrates, the bag rack 30 of the present invention projects beyond the rear end of the cart. This should not present problems when the bag racks are loaded with golf bags, and the cart is being driven out on the course. However, after closing time course personnel are required to drive the unloaded carts to a garage or the like for storage. The carts often must be driven in reverse to park them in the garage or other storage facility If the driver is not careful, the bag support element 36 of the rack could hit something and be damaged. To avoid this possibility, it is preferred that the mounting base 34 and the bag support element be hingedly connected as shown in FIGS. 6, 7 and 8. This type of connection permits the bag support element 36 to be folded over on top of the mounting base 34 when the rack is not in use so that the rack does not project beyond the rear end of the cart.

FIGS. 6–8 illustrate one type of hinge connection preferred for this purpose. Curved, slotted arms 50 and 52 are secured to the mounting base 34 and bag support 36, respectively. Arm 50 includes a cylindrical pin 54 which is engaged by a curvilinear groove 56 on arms 52. The movement of the bag support element 36 toward the mounting base 34 is limited by the length of the groove 56. The length of the groove should be selected to allow the bag support 36 to fold inwardly a sufficient distance so that it no longer projects beyond the rear end of the cart. FIG. 7 illustrates this arrangement in cross-section.

A preferred type of hinge is the tube and pin arrangement shown in FIGS. 6 and 8. An inner pin 58 extends through an outer tube 60 to hingedly connect the mounting base 34 and bag support 36. If necessary, the pin can be removed and arms 50 and 52 disconnected to remove the bag support element 36 from the rack.

The present golf bag rack, although preferred for installation on the upper surface of the rear fender of a golf cart, could also be mounted in the cart bag recess. Sufficient space is provided for two average sized golf bags to be held in an upright position in the bag recess. This same space will also accommodate two racks according to the present invention placed next to each other on the floor of the recess.

Several of the present golf bag racks could also be mounted side-by-side on the top surface of a flat base member (not shown) to produce a stationary rack for a desired number of golf bags. Such a rack could be provided at a driving range, outside the golf clubhouse, near the start of the course or anywhere temporary storage for a number of golf bags is desired.

The golf bag rack of the present invention has been described with respect to a preferred embodiment. However, modifications and changes to this preferred embodiment are also anticipated to fall within the scope of the present invention.

INDUSTRIAL APPLICABILITY

The golf bag holding rack of the present invention will find its primary application as an attachment to existing golf carts to expand the bag-carrying capability of available carts from two bags to four bags. However, the present rack may also be originally installed on new carts to provide the required bag-holding capacity and used to form a stationary rack capable of holding a desired number of golf bags.

We claim:

1. A rack for holding a golf bag mountable on a horizontal flat planar surface on a motor driven golf cart substantially parallel to the cart travel surface to expand the golf bag holding capacity of the cart, said rack comprising:
    (a) horizontal mounting base means for attaching said rack to said horizontal flat planar surface so that said mounting base means is substantially parallel to the cart travel surface;
    (b) support arm means for positioning a golf bag in an optimum angular position relative to said cart horizontal flat planar surface, said support arm means being connected to said horizontal mounting base means at an angle which supports the bag in said optimum position; and
    (c) bag engaging means on said horizontal mounting base means and on said support arm means for receiving and holding opposite ends of a golf bag so that the bag is supported in said optimum position.

2. A rack as described in claim 1, wherein said bag engaging means has a substantially semicircular configuration so that said bag engaging means extends slightly more than 180° around the circumference of a golf bag.

3. A rack as described in claim 1, further including mounting plate means to provide rigidity and stability when said rack is mounted on the flat planar surface.

4. A rack as described in claim 1, wherein said mounting base means and said support arm means are formed separately and said rack includes hinge means whereby said mounting base means and said support arm means are joined together at said angle.

5. A rack as described in claim 4, wherein said rack further includes stop means for limiting the movement of said support arm means about said angle.

6. A rack as described in claim 1, wherein said horizontal mounting base means and said support arm means are unitarily constructed of a single piece of material so that said angle is fixedly located between a terminal end of said mounting base means and a terminal end of said support arm means.

7. A rack as described in claim 6, wherein a first bag engaging means is located at the terminal end of said mounting base means and a second bag engaging means is located at the terminal end of said support arm means.

8. A rack as described in claim 6, wherein the angle between said mounting base means and said support arm means is within the range of 90° to 145°.

9. A rack as described in claim 8, wherein said angle is 132°.

10. A golf bag rack for holding a golf club receiving bag at a desired angled orientation to permit easy access to the golf clubs including a mounting base means for securing the rack to a planar surface, a bag support means for positioning the bag in the desired orientation, and bag engaging means for receiving the bottom and top of the bag to secure the bag in the desired orientation, wherein each of said mounting base means and said bag support means has a terminal end and a junction end, and the bag engaging means is attached to each terminal end and said junction ends are hingedly connected to form an angle that will hold said bag in said desired orientation.

11. A golf bag rack as described in claim 10, wherein said angle is in the range of 90° to 145°.

12. A golf bag rack as described in claim 11, wherein said angle is 132°.

13. A golf bag rack as described in claim 12, wherein each said bag engaging means extends more than 180° around said bag to prevent lateral movement of said bag in said rack.

14. A golf bag rack as described in claim 13, wherein said mounting base means and said bag support means are each formed from a single piece of flat substantially rectangular cross-section metal and said bag engaging means is formed from a rolled metal bar.

15. A golf bag rack as described in claim 13, wherein said rack is formed completely from an ultrahigh molecular plastic material.

16. A golf bag rack as described in claim 13, further including mounting plate means for securely mounting said rack to said planar surface.

17. A golf bag rack as described in claim 16, wherein said mounting plate means is positioned on the opposite side of said planar surface from said mounting base means to hold said rack securely and stably on said planar surface.

* * * * *